Figure 1:
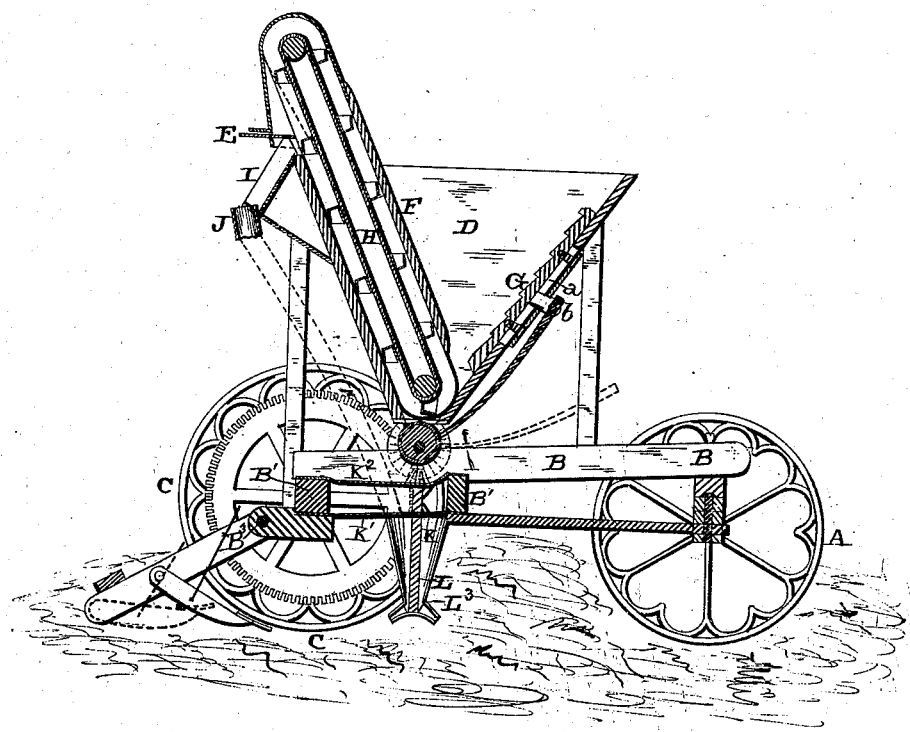

(No Model.)

J. E. HENRIS.
SEEDER AND CULTIVATOR.

No. 272,046.

2 Sheets—Sheet 1.

Patented Feb. 13, 1883.

Witnesses:
Louis F. Gardner
E. D. York

Inventor:
Jno. E. Henris
per
J. B. Webster
Atty.

(No Model.)  
J. E. HENRIS.  
SEEDER AND CULTIVATOR.  
2 Sheets—Sheet 2.
No. 272,046. Patented Feb. 13, 1883.
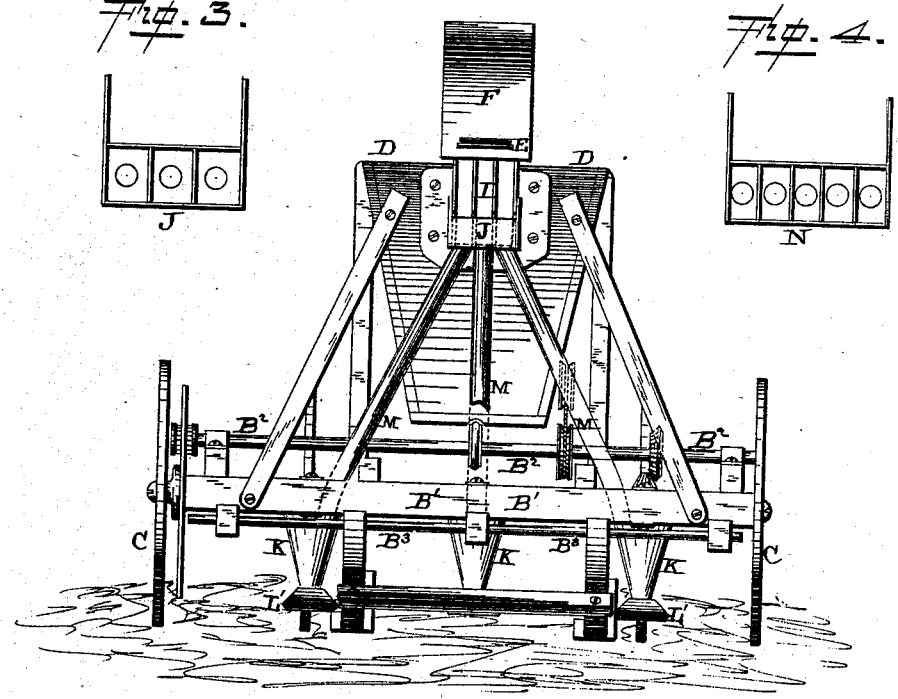
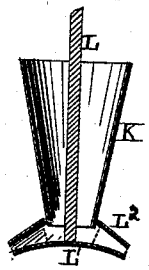

UNITED STATES PATENT OFFICE.

JOHN E. HENRIS, OF COLLEGEVILLE, CALIFORNIA.

SEEDER AND CULTIVATOR.

SPECIFICATION forming part of Letters Patent No. 272,046, dated February 13, 1883.

Application filed May 23, 1882. (No model.)

*To all whom it may concern:*

Be it known that I, JOHN E. HENRIS, a citizen of the United States, residing at Collegeville, in the county of San Joaquin and State of California, have invented certain new and useful Improvements in Seeder and Cultivator, being an improvement on Letters Patent No. 253,285; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a vertical longitudinal section of my invention. Fig. 2 is a rear end view of the same. Figs. 3, 4, and 5 are detail views.

Similar letters of reference indicate corresponding parts.

The object of this invention is to improve the construction of the seeder and cultivator for which Letters Patent No. 253,285 were granted to me February 7, 1882, so as to make it more convenient in use and more effective in operation.

The invention will first be described in connection with the drawings, and then pointed out in the claims.

A represents the front wheels and gear of a wagon carrying a longitudinal frame, B, which frame B at its rear is attached to a transverse frame, B', which in turn is supported by side wheels, C. The wheels A and C and frames B and B' thus form the vehicle or wagon.

To the frame B' and B are attached legs supporting a hopper, D, having inclined ends and sides. Within the front side of the hopper is a feeder-plate, G, adapted to move up and down in side guides. This plate G has its surface notched transversely and operated by mechanism as will be hereinafter shown. Within the rear end of the hopper D is a covered trough, F, having upper and lower transverse shafts, with rollers thereon, carrying an elevator, H, with cups for moving the seed upward to the top of the hopper, and operated by mechanism as will be hereinafter shown. At the apex of the trough F is a sliding regulating-plate, E, fitting into grooves at the connection of the trough F and hopper D. A fixed discharging-trough, I, divided into sections, is fitted into the edge of the hopper D at the exit of the trough F, and having horizontally attached beneath, as shown in Fig. 2, a threefold spout, J, its openings being at the two ends and at the middle, as shown.

In the hopper D, beneath the feeding-plate G, is a slot, $a$, through which a rod, $b$, passes, and is secured to the under side of the feeding-plate G. Its other end extends rearwardly, and is attached and operated as hereinafter explained.

Parallel with transverse frame B' is a driving-shaft, $B^2$, operated by gearing of wheels C, and having at suitable intervals and positions a pulley connected by belt with that on the lower shaft of elevator H and operating it, and a pulley connected to the lower end of rod $b$, which operates plate G. Funnel-shaped receivers K are rigidly attached at suitable intervals to cross-timbers K', attached beneath frame B'. These receivers K are open beneath, and have within each of them a vertical spindle, L, the upper end of which turns in bearing in cross-timbers $K^2$, attached on top of beams of frame B' and parallel with cross-timbers K', a hole through which latter admits the passage of the spindle L. The lower points of each of the spindles L are provided with horizontal distributing-disks L', having flanged top surfaces, and over them plates $L^2$, to prevent the seed from being thrown other than outwardly. At the tops of the vertical spindles L are bevel-pinions, before referred to, meshing into bevel-gears upon shaft $B^2$, from which they are set in motion.

M are carrier-spouts, which extend from the respective openings of threefold spout J to receivers K, as shown in Fig. 2.

To the rear section of frame B' is attached a cross shaft or rod, $B^3$, upon which are independently-acting arms carrying cultivator-shanks with shovel-shaped points, as shown in Fig. 1. The mode of operation when it is desired to sow and cultivate by use of mechanism as shown in Fig. 1 is by pouring the seed into hopper D, whereupon the feeding-plate G, operated from shaft $B^2$, as shown, pushes the grain into the mouth of trough F, where it is received by elevator H, operated, as shown, by pulley on shaft $B^2$, and conveyed by it to discharge end of trough F and poured out upon discharge-trough I, its flow being governed by sliding regulating-plate E, falling into the threefold spout J, from thence into the respective carrying-spouts M, down into receivers K, which permit it to drop upon disks L', which, revolving with spindles L, throw the seed outwardly, being aided, as hereinbefore shown, by flanges upon their upper surface and protecting-plates L², upon the ground, equally scattering it, to be covered by the following cultivators. The entire motive power is of course derived from gearing on wheels C, turning shaft B², with its series of pulleys and bevel-gears, as hereinbefore described.

The above-described method of sowing by scattering the seed upon unplowed ground in front of the following cultivators with shovel-points employs the entire mechanism and parts, as shown in Fig. 1. When it is desired to use turning-shares and sow the seed wheat or barley in the "lap" of the furrow, the cultivator-arms, shanks, and points are removed, and a frame having shanks with turning-shares bolted thereto is attached to ends of shaft B³, said frame being hinged at each connecting end, so that it may rise and fall with uneven lands. Threefold spout J is then removed and has substituted in its place a receiving-spout, N, having as many chambers and delivery-holes as there are plows upon frame, from each of which chambers the seed is let through carrying-spouts M, to be discharged directly in the lap of each respective furrow of each plow. In this use of my invention the receivers K, spindles L, and disks L', &c., are removed from frame B'.

Having thus described my invention, what I claim, and desire to secure by Letters Patent, is—

1. In a seeder and planter, the combination of the seed-box D, feeding-plate G, and its operating mechanism, with the elevator H, conductors I, box J, divided as shown, and the pipes M, leading to the receivers K, substantially as shown.

2. In a seeder and planter, the combination of the seed-box D, feed-plate G and its mechanism, elevator H, slide E, divided box N, pipes M, and receivers K, substantially as described.

3. In a seeder, the combination of the receiver K and the revolving shaft L, having a convex plate secured to its lower end, the lower end of the receiver being flared outward, substantially as set forth.

In testimony whereof I affix my signature in presence of two witnesses.

JOHN E. HENRIS.

Witnesses:
 ELIHU B. STOWE,
 JOSHUA B. WEBSTER.